(12) United States Patent
Huang et al.

(10) Patent No.: US 6,469,915 B2
(45) Date of Patent: Oct. 22, 2002

(54) RESONANT RESET DUAL SWITCH FORWARD DC-TO-DC CONVERTER

(75) Inventors: Guisong Huang; Yilei Gu; Zhizheng Liu; Alpha J. Zhang, all of Shanghai (CN)

(73) Assignee: Delta Electronics Inc., Taoyuan Sien (TW)

( * ) Notice: Subject to any disclaimer, the term of this patent is extended or adjusted under 35 U.S.C. 154(b) by 0 days.

(21) Appl. No.: 09/845,686

(22) Filed: Apr. 30, 2001

(65) Prior Publication Data

US 2002/0034085 A1 Mar. 21, 2002

(30) Foreign Application Priority Data

Sep. 15, 2000 (TW) ..................................... 089118884 A

(51) Int. Cl.[7] .............................................. H02M 3/335
(52) U.S. Cl. ...................................... 363/25; 363/56.08
(58) Field of Search ............................. 363/24, 25, 26, 363/56.06, 56.08, 89, 134, 133, 22, 23

(56) References Cited

U.S. PATENT DOCUMENTS 4,736,284 A * 4/1988 Yamagishi et al. ............ 363/16
5,600,547 A * 2/1997 Kim ............................ 363/124
5,822,201 A * 10/1998 Kijima ................... 315/DIG. 5
6,141,226 A * 10/2000 Gak et al. .................... 363/134

* cited by examiner

Primary Examiner—Shawn Riley
(74) Attorney, Agent, or Firm—Darby & Darby

(57) ABSTRACT

A resonant reset dual switch forward converter is disclosed. The resonant reset dual switch forward converter includes an input for accepting a DC voltage; a transformer having a primary winding and a secondary winding; a first and a second switch connected in series with the primary winding of the transformer for periodically connecting the input to the primary winding; a resonant capacitor for resetting the transformer during the OFF time of the first and second switches; and an auxiliary switch remaining OFF during the ON time of the first and second switches, and connecting the primary winding to the resonant capacitor during the OFF time of the first and second switches. The resonant reset dual switch forward converter provides a switching duty cycle greater than 50%, obtains a zero-voltage-switching condition for the first and second switches, and maintains the voltage stress of the f first and second switches around the input voltage.

10 Claims, 10 Drawing Sheets

S1, S2

Vp

Vds

RESONANT RESET DUAL SWITCH FORWARD DC-TO-DC CONVERTER

BACKGROUND OF THE INVENTION

1. Field of the Invention

This invention relates generally to the power supply systems that include DC-to-DC conversion operations. More particularly, this invention relates to an improved circuit design and configuration of a forward type DC-to-DC converter with resonant reset.

2. Description of the Prior Art

Forward type topology is widely used in DC-to-DC converters due to the simplicity of the structure. In high input voltage operation, dual switch forward topology is used to reduce the voltage stress of main switches. Due to the limitations of magnetic reset mechanisms, dual switch forward topology is not suitable for wide input voltage operations.

FIG. 1A and FIG. 1B respectively show the configuration and key operation waveforms of a dual switch forward DC-to-DC converter of the prior art. Two switches are employed in the primary side. When the two switches turn on, the transformer primary winding is connected to the input voltage and the energy is delivered from source to load. When the two switches turn off, the magnetizing current passes by the two clamping diodes, which are denoted as Da1 and Da2 in FIG. 1A. The input voltage is applied to the primary winding reversely and the magnetizing current is reset to zero. Since the drain-to-source voltage of the switches is clamped to the input voltage, the switches only endure the voltage stress of the input.

However, since the reset voltage is equal to the input voltage, the reset time is also equal to the turn-on time of the switches in order to keep the voltage-second balance for the transformer. Thus, the maximum switching duty cycle is limited to less than 50% for low input operation conditions. With the increase of the input voltage, the duty cycle becomes small and the performance of the converter deteriorates.

For reducing the conduction loss of the primary side and lowering the voltage stress of the secondary side, it is desirable to increase the duty cycle of the forward converter to greater than 50%. If a resonant reset mechanism is provided in the forward converter, the duty cycle can be designed over than 50% since the reset voltage can be higher than input voltage.

FIG. 2A and FIG. 2B respectively show the configuration and key operation waveforms of a single-ended forward DC-to-DC converter with resonant reset of the prior art. In this converter only one switch S1 is employed in the transformer primary side, and a resonant reset capacitor Cr is connected in parallel with the switch S1. When the switch S1 turns on, the transformer primary winding is connected to the input voltage Vin, and the energy is delivered from source to load by the transformer coupling. When the switch S1 turns off, the magnetizing current charges the resonant capacitor Cr, and the voltage of capacitor Cr increases and resets the transformer core. After a half of resonant period the magnetizing current is reset to zero and the voltage of the primary winding remains zero due to the cross conduction of the secondary rectifier. The voltage of capacitor Cr maintains as input voltage Vin until the switch S1 turns on. When switch S1 turns on, the capacitor Cr is discharged through S1, and the energy stored in capacitor Cr is dissipated in switch S1. Thus, the power loss of switch S1 becomes larger. Especially for high input voltages, the power loss of switch S1 increases significantly because the energy stored in capacitor Cr increases with the square of the input voltage.

The other disadvantage is that the voltage stress of the switch S1 is the sum of the maximum reset voltage and input voltage, which is about double of input voltage. For these reasons, this topology is only suitable for low input voltage and low power applications.

Therefore, a need still exists to provide a new and improved power converter topology that combines the advantages of dual switch forward and resonant reset forward, but overcomes the disadvantages of the prior art.

SUMMARY OF THE PRESENT INVENTION

It is accordingly an object of the invention to provide a novel and improved resonant reset dual switch forward DC-to-DC converter topology, which overcomes the above-mentioned disadvantages of the prior art. In the preferred embodiment of the present invention, a resonant reset dual forward converter comprises: an input for accepting a DC voltage; a transformer having a primary winding and a secondary winding; two main switches connected in series with the primary winding of the transformer for periodically connecting the input to the primary winding; a resonant capacitor for resetting the transformer during the OFF time of the main switch; an auxiliary switch remaining OFF during the ON time of the main switch, and connecting the primary winding to the resonant capacitor during the OFF time of the main switch; and a rectification circuit connecting the secondary winding to the output.

Due to the large reflected output current, the low side main switch and auxiliary switch turn on under a zero-voltage condition; so a larger resonant capacitor can be used to reset the transformer.

In a further embodiment of this invention, an extra inductor is connected in series with the primary winding or the secondary winding to obtain a zero-voltage-switching condition for the high side switch.

In another embodiment of this invention, a center-tapped S1 rectification circuit is employed. The output inductor can be reduced significantly, and the output voltage ripple is minimized.

In another embodiment of this invention, a current doubler rectification circuit is employed. The output inductor is divided into two smaller ones and the secondary winding need not be tapped. The output voltage ripple is also minimized.

In another embodiment of this invention, a synchronous rectifier circuit is employed to reduce the rectification loss. Meanwhile, a control circuit is needed to maintain the freewheeling rectifier on during the OFF time of main switches.

An advantage of the present invention is that it provides the ability to enlarge the switching duty cycle and reduce the conduction loss of the primary switches.

Another advantage of the present invention is that it obtains a soft switching condition for the main switches. Thus, it provides a converter with high power efficiency.

Another advantage of the present invention is that it requires lower rating voltage switches, so that it can be used for high input voltage conversion design.

BRIEF DESCRIPTION OF THE DRAWINGS

For a more complete understanding of the present invention, reference is now made to the following description taken in conjunction with the accompanying drawings, in which.

DETAILED DESCRIPTION OF THE INVENTION

Figure 1A:
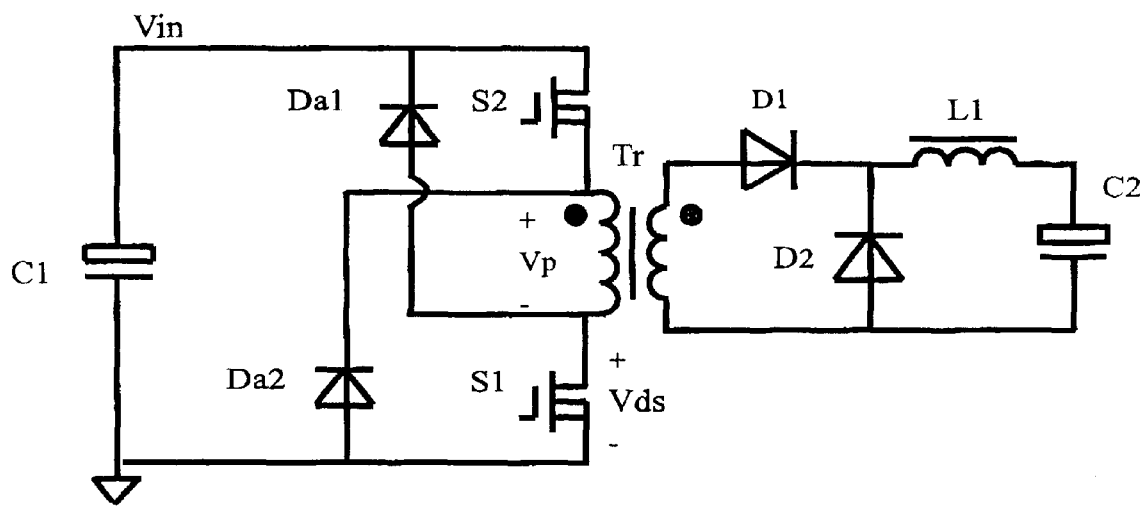
FIG. 1A is a schematic diagram of a conventional dual switch forward DC-to-DC converter of the prior art.
Figure 1B:
FIG. 1B illustrates the key operation waveforms of dual switch forward DC-to-DC converter of FIG. 1A.
Figure 1B:
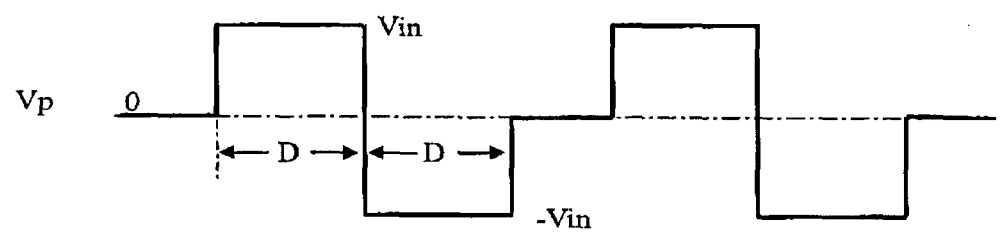
Figure 1B:
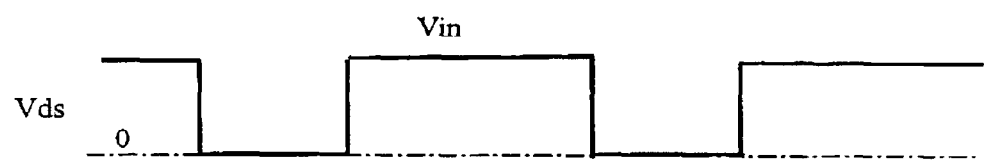
Figure 2A:
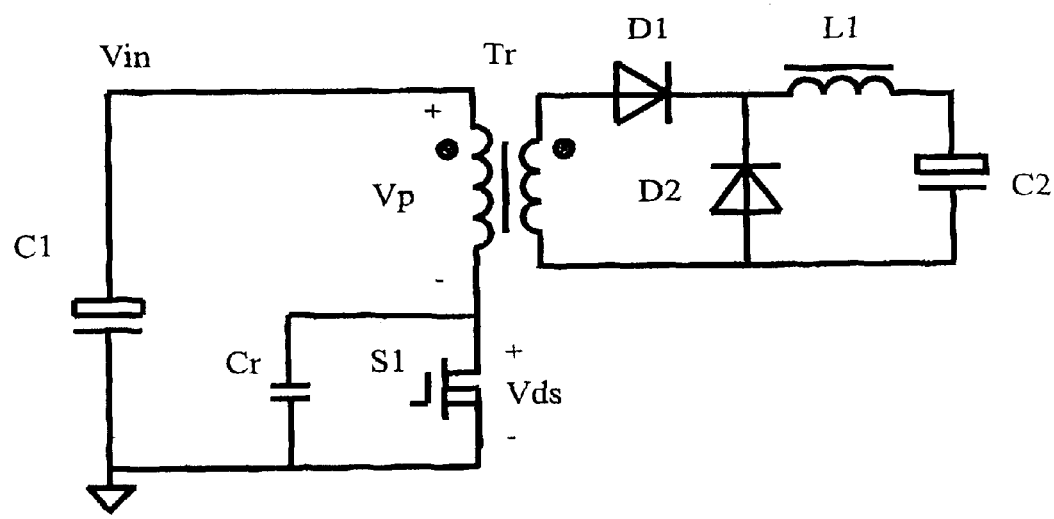
FIG. 2A is a schematic diagram of a single-ended forward with resonant reset DC-to-DC converter of another prior art.
Figure 2B:
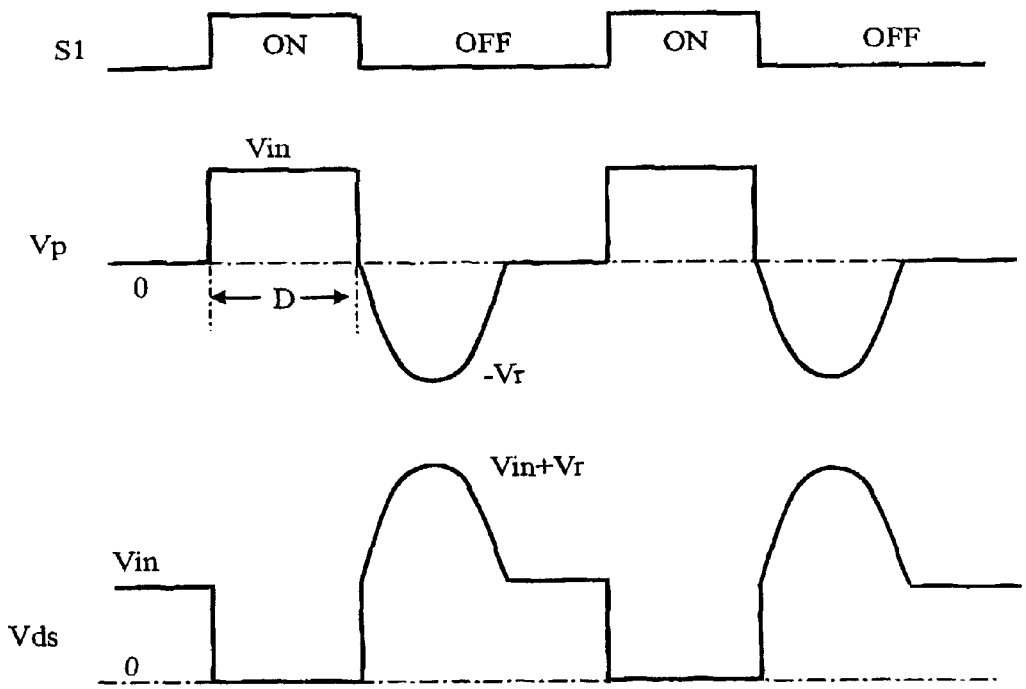
FIG. 2B illustrates the key operation waveforms of single-ended forward with resonant reset DC-to-DC converter of FIG. 2A.
Figure 3A:
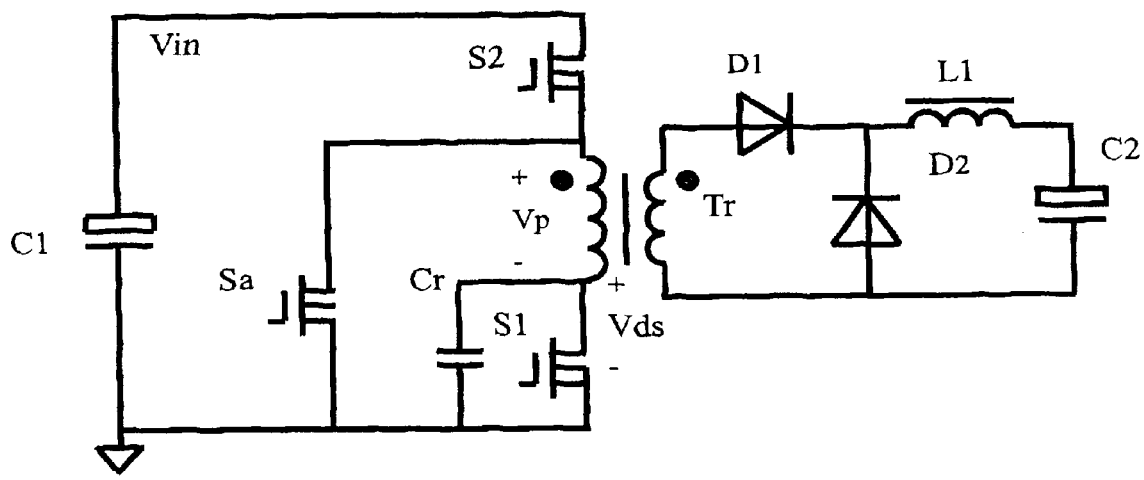
FIG. 3A is a schematic diagram of the resonant reset dual switch forward DC-to-DC converter in accordance with a preferred embodiment of the present invention.

FIG. 3A is a schematic diagram of a resonant reset dual switch forward DC-to-DC converter in accordance with the present invention. A capacitor C1 provides a stable input voltage with low side and high side. Two main switches S1 and S2 are connected in series with the primary winding of transformer Tr. In the turn-on period, main switches S1 and S2 connect the transformer primary winding to the input voltage, wherein switch S1 connects to the low side and switch S2 connects to the high side. A capacitor Cr connects the terminal of the primary winding that connects with switch S1 and the low side of input voltage. An auxiliary switch Sa connects the terminal of the primary winding that connects with switch S2 and the low side of input voltage. A control signal is applied to the auxiliary switch Sa, so that when main switches S1 and S2 turn off, the primary winding is connected to the capacitor Cr in parallel and is reset by the voltage of the capacitor Cr.

In the secondary side, a rectifier circuit including rectifiers D1, D2, and a filter circuit including inductor L1 and capacitor C2, which are shown in FIG. 3A. When main switches S1 and S2 turn on, rectifier D1 conducts current from secondary winding to inductor L1 and feeds to load. When main switches S1 and S2 turn off, rectifier D1 is kept off and rectifier D2 conducts the output current.

Figure 3B:
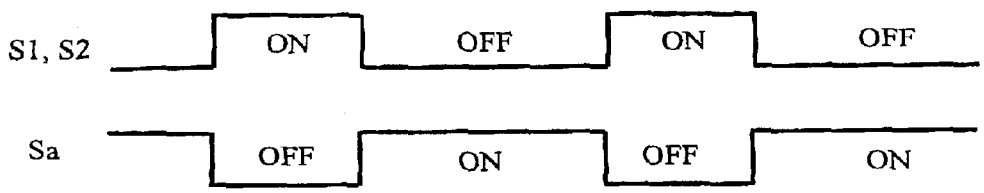
FIG. 3B illustrates the key operation waveforms of the resonant reset dual switch forward DC-to-DC converter of FIG. 3A.
Figure 3B:
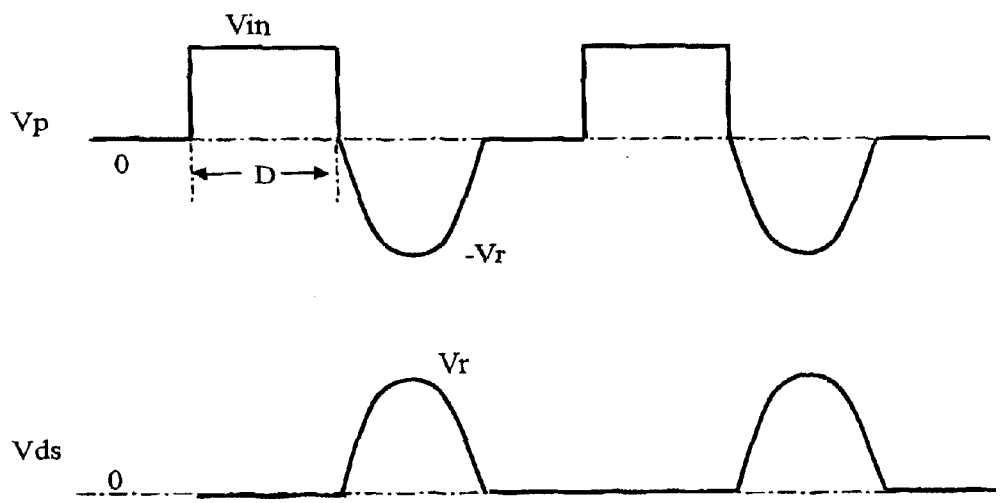

FIG. 3B illustrates the key operation waveforms of the resonant reset dual switch forward DC-to-DC converter of FIG. 3A.

Figure 4A:
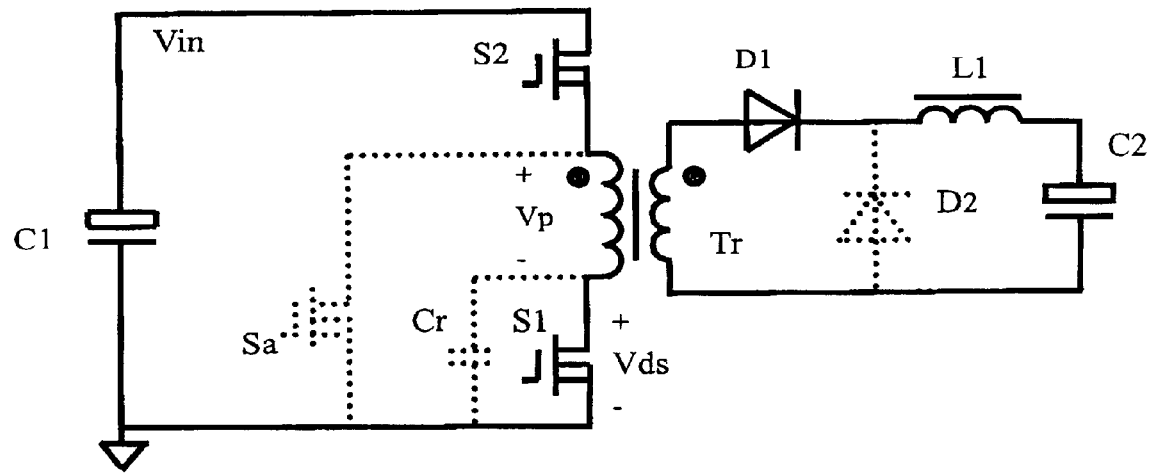
FIG. 4A and FIG. 4B are the equivalent operation circuits of FIG. 3A.
Figure 4B:
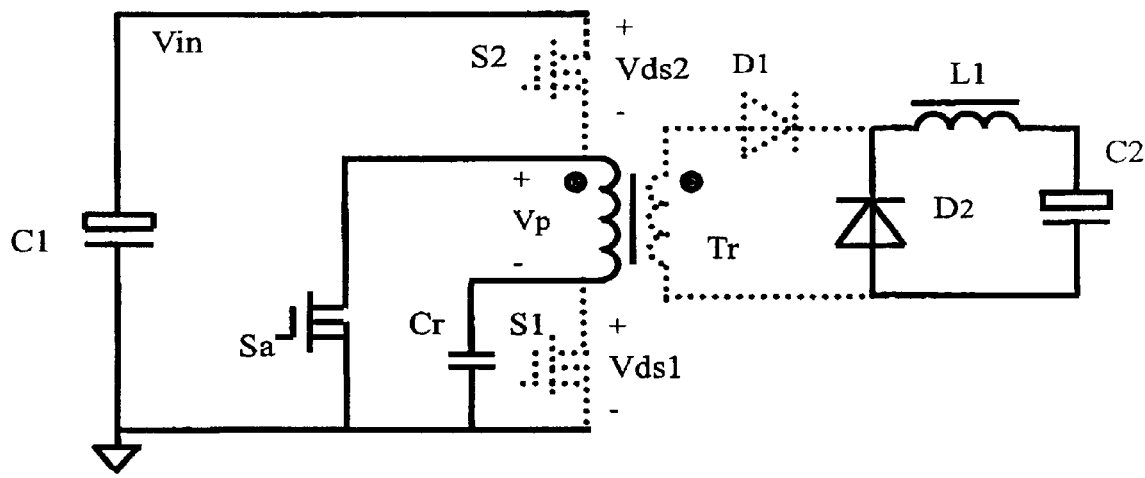

To illustrate the operation principle of this converter, the operation is divided into two operation modes, the equivalent operation circuits of which are shown in FIG. 4A and FIG. 4B.

A: Forward Mode

When main switches S1 and S2 turn on, the energy in the primary side is forwardly delivered to the secondary side.

B: Resonant Reset Mode

When main switches S1 and S2 turn off, auxiliary switch Sa turns on, and the transformer primary winding is connected with capacitor Cr. By the resonant process of capacitor Cr and magnetizing inductance of the transformer Tr, the transformer Tr is reset.

Figure 5:
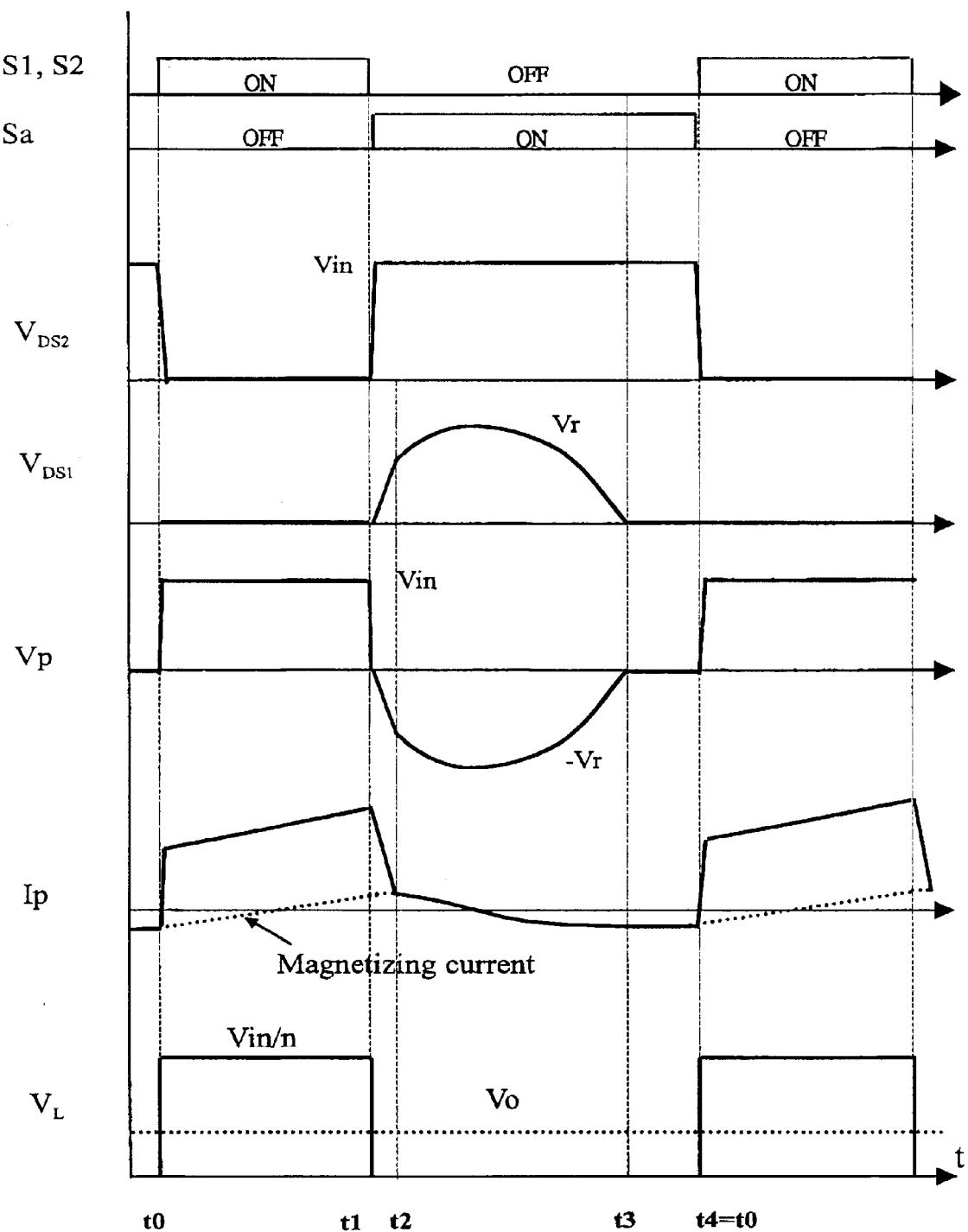
FIG. 5 illustrates the key waveforms of the resonant reset dual switch forward DC-to-DC converter of the present invention.

To illustrate the detailed operation and show the features of this converter, the key waveforms of this converter are shown in FIG. 5. Several time intervals are described as follows:

[1] t0<t<t1

In this time interval, main switches S1 and S2 turn on and auxiliary switch Sa turns off. The drain-to-source voltages of main switches, Vds1 and Vds2, keep zero and the input voltage is applied to the transformer primary winding, so the voltage of transformer is Vin, which keeps the magnetizing current rising linearly. The primary current Ip is the sum of the magnetizing current and reflected output current. The voltage applied to the output filter is the reflected input voltage in secondary side.

[2] t1<t<t2

At time t1 main switches S1 and S2 turn off. After a short dead time, auxiliary switch Sa turns on. The terminal of the primary winding that connects with switch S2 is connected to the low side of the input voltage. The primary current Ip charges the capacitor Cr, the voltage of capacitor Cr increases and the primary current Ip decreases. At t=t2, the energy stored in the leakage inductance of the transformer completely transfers to capacitor Cr. The primary current is equal to the magnetizing current.

[3] t2<t<t3

In this time interval, resonance occurs between capacitor Cr and the magnetizing inductance. The magnetizing current decreases to zero and becomes negative. The voltage of capacitor Cr increases at first, then decreases due to the negative magnetizing current. At time t3, voltage of capacitor Cr drops to zero, and the magnetizing current passes through the body diode of switch S1.

[4] t3<t<t4

In this time interval, the body diode of switch S1 and is auxiliary switch Sa are both on, the voltage across the primary winding is kept zero, so the magnetizing current keeps constant until the main switches S1 and S2 turn on. At time t4, switch S1 turns on under a zero voltage condition. A new switching cycle begins.

The resonant reset dual switch forward converter of this invention has the following features:

Firstly, since the reset voltage is the resonant voltage of capacitor Cr, it can be made higher than the input voltage by selecting smaller capacitor Cr, so that the reset time can be shorter than switching on time and a switching duty cycle greeter than 50% can be obtained. This not only reduces the RMS current of the primary side but also decreases the voltage stress of rectifiers in secondary side.

Secondly, when main switches S1 and S2 turn off, the drain-to-source voltage of switch S1 is only the reset voltage, and the drain-to-source voltage of switch S2, which is clamped by auxiliary switch Sa, is equal to input voltage. Therefore, the voltage stress of main switches S1 and S2 is about the input voltage instead of double of the input voltage in the single-ended forward converter.

Thirdly, since switch S1 turns on when the voltage of capacitor Cr resonates to zero, no external power loss is generated. Further more, due to the parallel connection of capacitor Cr with switch S1, the turn-off loss of switch S1 is also reduced significantly. Therefore, the switching loss of this converter is much lower.

Figure 6:
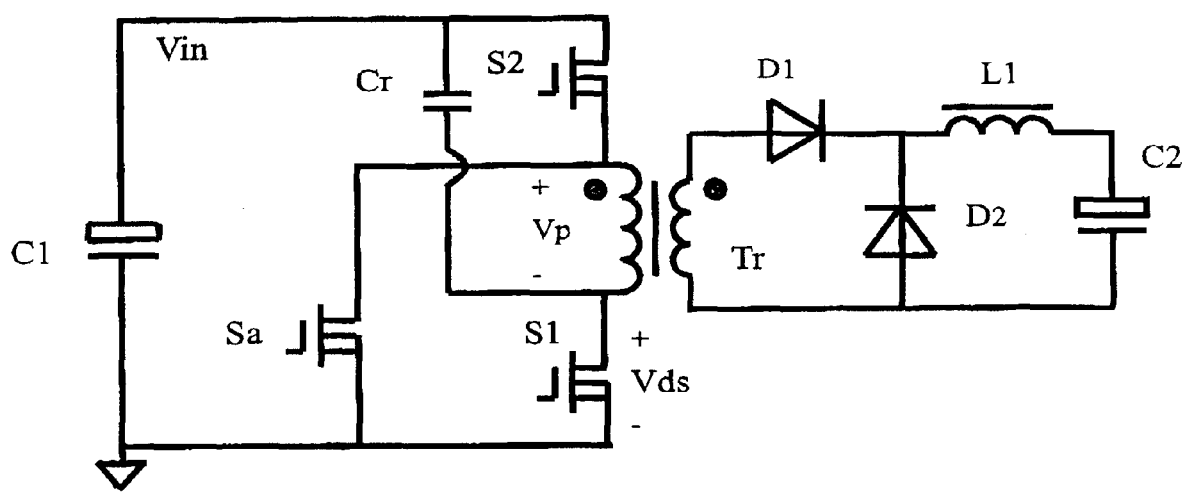
FIG. 6 is a schematic diagram of a resonant reset dual switch forward DC-to-DC converter in accordance with another preferred embodiment of present invention.

In a further embodiment of this invention, as shown in FIG. 6, the capacitor Cr can be connected between the high side of input voltage and the terminal of the primary winding that connects with switch S1. The operation waveforms of the transformer and switch S1, S2 and auxiliary switch Sa are the same as in the previous embodiment.

Figure 7A:
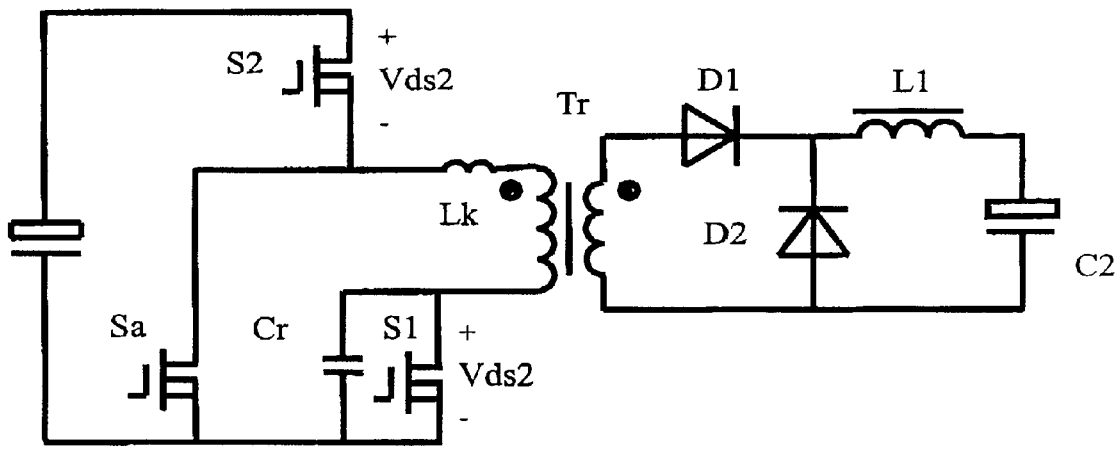
FIG. 7A and FIG. 7B illustrate structures for obtaining the zero-voltage-switching condition of the present invention.
Figure 7B:
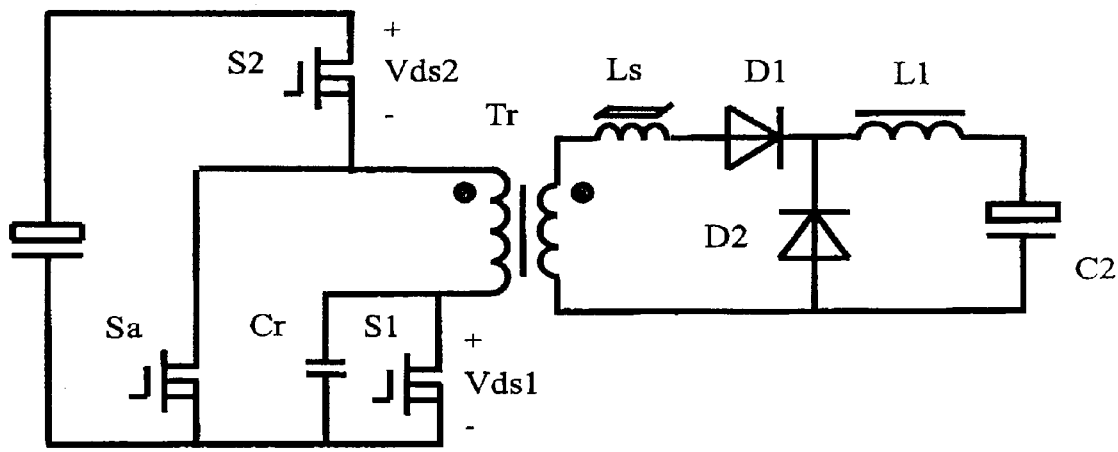
Figure 8:
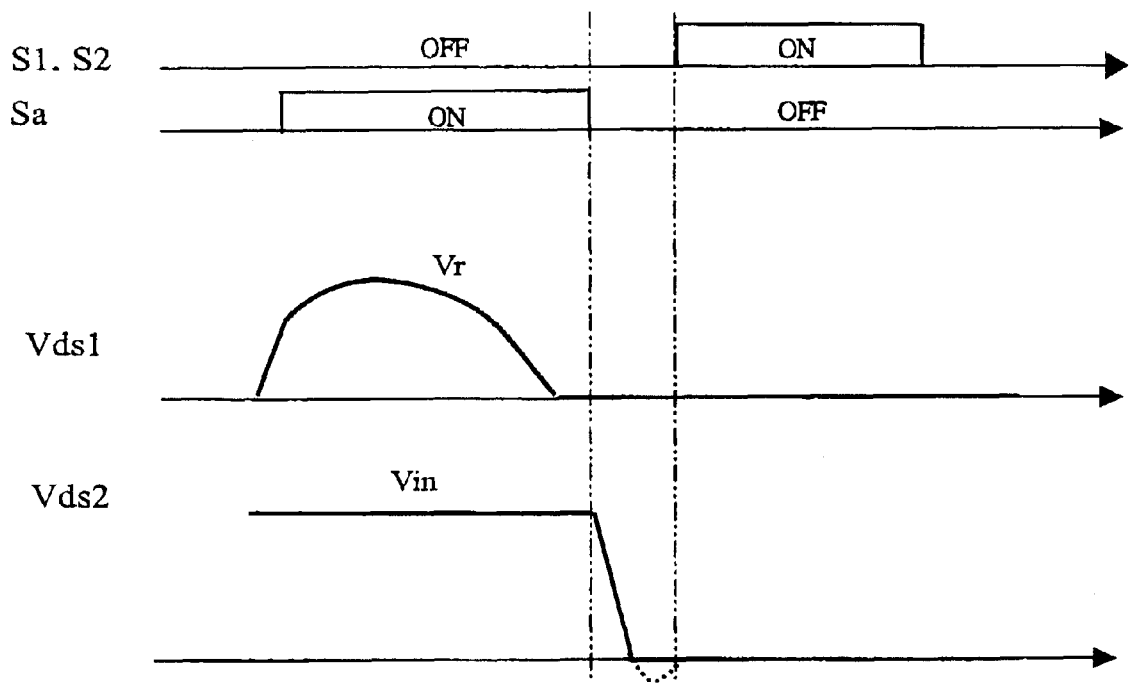
FIG. 8 illustrates the waveforms of the zero-voltage-switching condition for the main switches of FIG. 7A and FIG. 7B.

FIG. 7 shows alternate circuit configurations of this invention, where an extra inductor Lk or an extra inductor Ls is applied to and connected in series with the primary or secondary winding for achieving of zero voltage turn-on switching for high side switch S2. Before switch S2 turns on, auxiliary switch Sa turn off at first. The energy stored in inductance Lk or Ls will discharge the output parasitic capacitance of switch S2. Only if the inductance Lk or Ls is large enough, switch S2 can be turned on under zero voltage condition. The waveforms are shown in FIG. 8. These extra inductors could be either a linear inductor or a saturable inductor, and can be either external or integrated into transformer.

Figure 9:
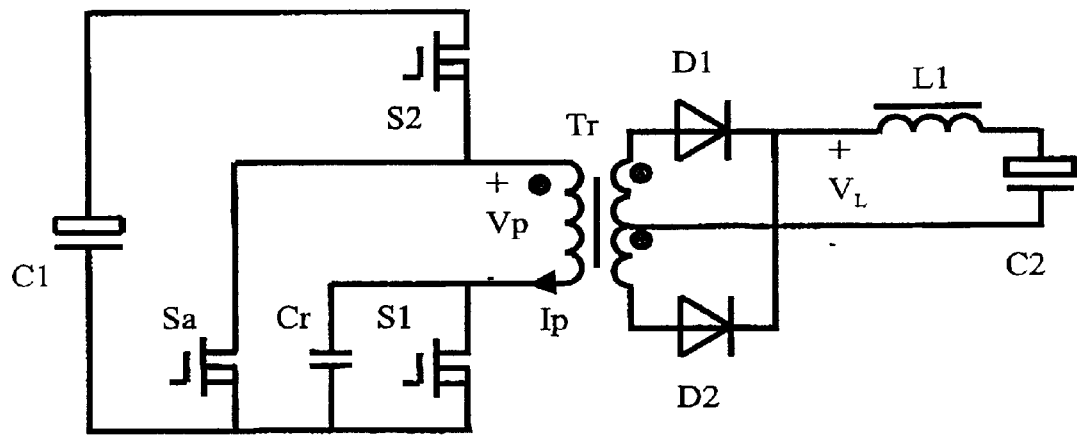
FIG. 9 is a schematic diagram of a resonant reset dual switch forward with center-tapped rectifier in accordance with a further embodiment of this invention.

FIG. 9 shows another circuit configuration of this invention, where the rectification circuit is in center-tapped connection. The secondary winding of the transformer Tr has first and second terminals and a tapping point. When the main switches S1 and S2 turn ON, the energy transfers from the first terminal and the tapping point to the output inductor through the first rectifier D1. When the main switches turn OFF, the energy transfers from the second terminal and the tapping point to the output inductor L1 through the second rectifier D2. Since the energy is transferred to the output inductor both in main switch ON and OFF, only a small inductor is needed, and the output voltage ripple can be reduced significantly.

Figure 10:
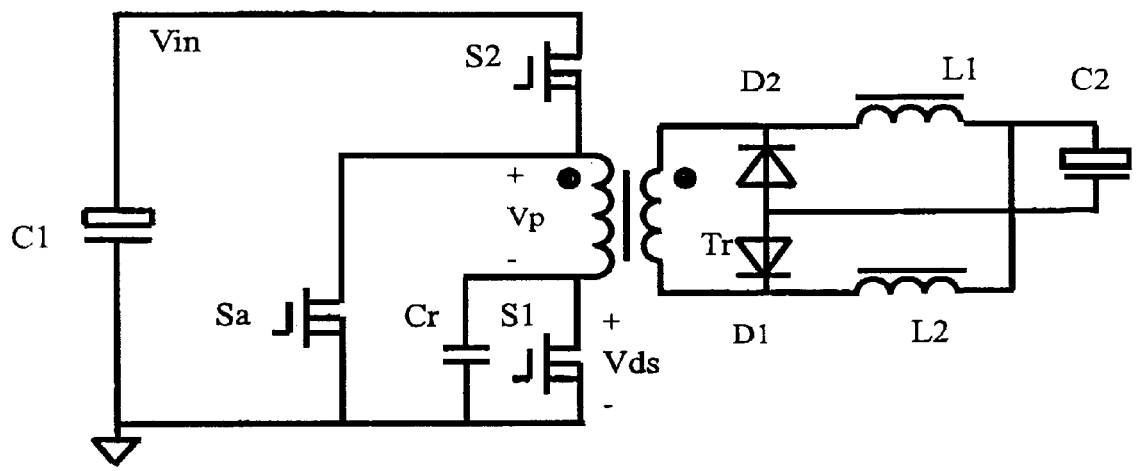
FIG. 10 is a schematic diagram of a resonant reset dual switch forward with current doubler rectifying in accordance with a further embodiment of this invention.

FIG. 10 shows another circuit configuration of this invention, where the rectification circuit is in current doubler connection. Two inductors L1, L2 are employed as output filters. Since the energy is transferred to output inductors L1, L2 both in main switch ON and OFF, output voltage ripple can also be reduced significantly.

Figure 11:
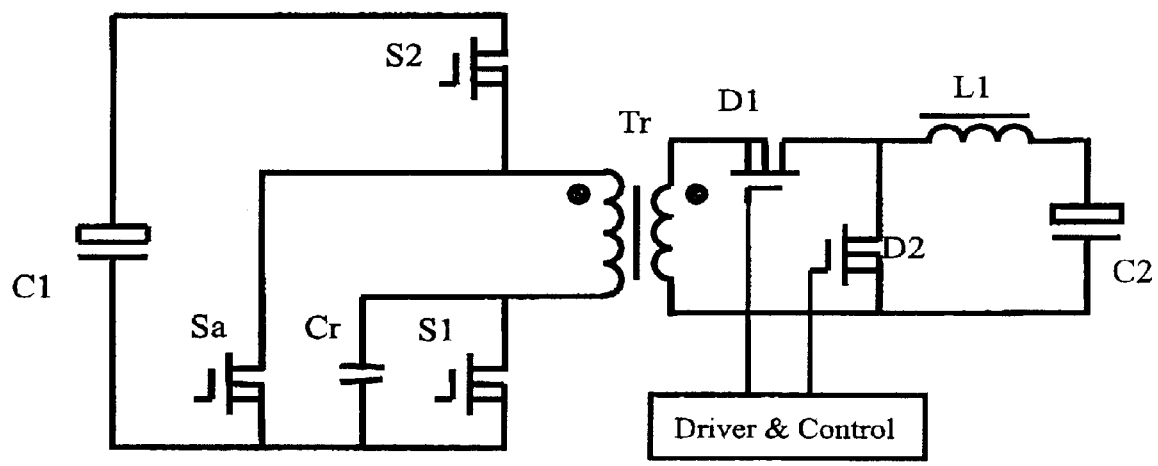
FIG. 11 is a schematic diagram of a resonant reset dual switch forward with synchronous rectifier in accordance with a further embodiment of this invention.

FIG. 11 shows another circuit configuration of this invention, where the rectification circuit employs synchronous rectifiers. Generally, a driver control circuit is required, which turns on rectifier D1 when main switches S1 and S2 turn on and keeps rectifier D2 ON during the OFF state of main switches S1 and S2.

Although the present invention has been described in terms of the presently preferred embodiments, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A resonant reset dual switch forward converter, comprising:

an input for accepting a DC voltage with a low side and a high side;

an output;

a transformer having a primary winding and a secondary winding;

a first and a second switch connected in series with the primary winding of the transformer for periodically connecting the input to the primary winding;

a resonant capacitor for resetting the transformer during the OFF time of the first and second switches;

a switching device remaining OFF during the ON time of the first and second switches, and connecting the primary winding to the resonant capacitor during the OFF time of the first and second switches; and a rectification circuit connecting the secondary winding to the output.

2. The converter of claim 1 wherein the switching device connects one end of the primary winding with the low side of the input.

3. The converter of claim 2 wherein the resonant capacitor connects the other end of the primary winding with the low side of the input.

4. The converter of claim 2 wherein the resonant capacitor connects the other end of the primary winding with the high side of the input.

5. The converter of claim 1 wherein the first and second switches and the switching device each include a body diode.

6. The converter of claim 1 wherein an extra inductor is connected in series with the primary winding of the transformer.

7. The converter of claim 1 wherein an extra inductor is connected in series with the secondary winding of the transformer.

8. The converter of claim 1 wherein the secondary winding of the transformer has first and second terminals and a tapping point; whereby, when the first and second switches turn on, the energy transfers from the first terminal and the tapping point to the output, and when the first and second switches turn off, the energy transfers from the second terminal and the tapping point to the output.

9. The converter of claim 1 wherein the rectification circuit includes a first and second rectifier and a first and second inductor; whereby, when the first and second switches turn on, the energy transfers from the first rectifier and the first inductor to the output, and when the first and second switches turn off, the energy transfers from the second rectifier and second inductor to the output.

10. The converter of claim 9 wherein the rectifiers are synchronous rectifying switches.

* * * * *